(12) United States Patent
Spagnolo

(10) Patent No.: US 6,523,337 B2
(45) Date of Patent: Feb. 25, 2003

(54) SG PRUNING MACHINE

(75) Inventor: Fred Spagnolo, Mildura (AU)

(73) Assignee: F&T Spagnolo TTY Ltd., Mildura (AU)

( * ) Notice: Subject to any disclaimer, the term of this patent is extended or adjusted under 35 U.S.C. 154(b) by 0 days.

(21) Appl. No.: 09/837,201

(22) Filed: Apr. 19, 2001

(65) Prior Publication Data
US 2002/0043061 A1 Apr. 18, 2002

(30) Foreign Application Priority Data
Apr. 20, 2000 (AU) .............................. PQ7055
Nov. 8, 2000 (AU) .............................. PR1323

(51) Int. Cl.[7] .......................... A01G 3/00; A01D 34/44
(52) U.S. Cl. .............................. 56/234; 56/15.5; 56/17.5
(58) Field of Search .................................. 56/12.7, 15.5, 56/233, 234, 235, 255, 238, 16.7, 17.5, 295, DIG. 17; 47/4

(56) References Cited

U.S. PATENT DOCUMENTS

| 3,138,911 | A | * | 6/1964 | Pounds | 144/24.13 |
|---|---|---|---|---|---|
| 3,665,685 | A | * | 5/1972 | Allard | 56/10.4 |
| 3,857,225 | A | * | 12/1974 | Knudson | 56/13.6 |
| 4,158,945 | A | * | 6/1979 | Burke | 56/295 |
| 4,206,585 | A | * | 6/1980 | Pollock | 56/235 |
| 4,250,699 | A | * | 2/1981 | Hallberg | 56/295 |
| 4,291,526 | A | * | 9/1981 | Hiyama et al. | 56/330 |
| 4,297,830 | A | * | 11/1981 | Dufner | 56/13.6 |
| 4,302,922 | A | * | 12/1981 | Guerndt et al. | 56/235 |
| 4,543,775 | A | * | 10/1985 | Horn et al. | 56/235 |
| 4,733,525 | A | * | 3/1988 | Pellenc et al. | 56/235 |
| 4,998,401 | A | * | 3/1991 | Terai et al. | 56/255 |
| 5,430,999 | A | * | 7/1995 | Grant | 56/11.9 |
| 5,544,444 | A | * | 8/1996 | Oldridge | 47/4 |
| 5,669,213 | A | * | 9/1997 | Britton | 56/17.5 |
| 5,673,545 | A | * | 10/1997 | Friesen | 56/255 |
| 5,694,753 | A | * | 12/1997 | Dellinger | 56/234 |
| 5,737,908 | A | * | 4/1998 | Andelfinger | 144/34.1 |
| 6,250,056 | B1 | * | 6/2001 | Spagnolo | 56/235 |

FOREIGN PATENT DOCUMENTS

WO    WO 98/30079    7/1998

* cited by examiner

Primary Examiner—Thomas B. Will
Assistant Examiner—Nathan Mammen
(74) Attorney, Agent, or Firm—Oliff & Berridge, PLC

(57) ABSTRACT

A pruning machine for pruning vegetation includes a frame arranged for connection to a tractor or the like so as to enable the machine to be moved along the vegetation to be pruned. A first pruning assembly is arranged for attachment to the frame, the first pruning assembly including first and second pruning apparatus arranged so that in use they can be positioned either side of a vegetation support wire on which required vegetation is located. The first and second pruning apparatus are arranged to prune non-required vegetation extending substantially above and/or below the support wire.

5 Claims, 5 Drawing Sheets

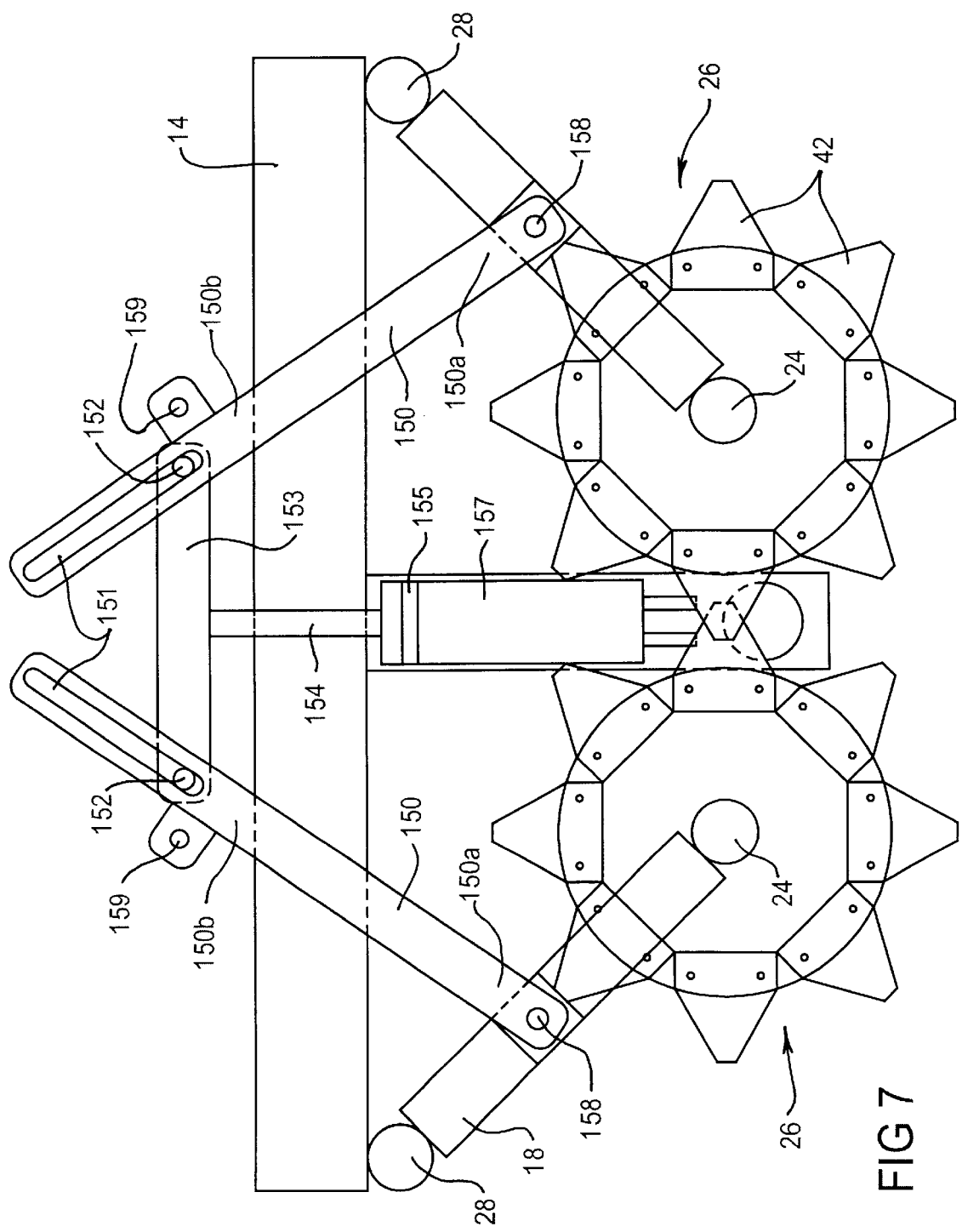

SG PRUNING MACHINE

FIELD OF THE INVENTION

The present invention relates to a pruning machine. More particularly, the invention relates to a pruning machine which can be mounted to a tractor or the like and which is arranged for pruning trellised vines, fruit trees or other vegetation.

BACKGROUND OF THE INVENTION

Pruning is a necessary part of most commercial fruit and plant harvesting enterprises. Pruning at particular points in a plant's growth cycle results in optimized production of fruit or other harvestable matter.

Manual pruning of vines is a particularly time consuming and labour intensive process. Accordingly, machines have been developed to prune vines and thereby increase overall efficiency. Unfortunately, due to the fact that trellised vines are grown along support wires the orientation of the vines themselves and the presence of support wires and support posts make them extremely difficult to successfully prune mechanically.

When pruning vines, it is critical that no damage occurs to the main trunk of the vines or the cordons which extend along the support wires. If they are damaged during pruning there will be reduced harvest or the possibility that the vine will actually die. During pruning it is only the canes which extend from the cordons which should be removed. One of the problems with current mechanical pruning machines is that they may damage the cordons or may themselves be damaged when they strike the support posts which support the support wires. Another problem is that they cannot cut both below and above a cordon wire without damaging the cordon or the vine trunk. The present invention seeks to provide an improved pruning machine which addresses at least some of the abovementioned problems.

SUMMARY OF THE INVENTION

According to a first aspect of the present invention there is provided a pruning machine for pruning vegetation, said machine including a frame arranged for connection to a tractor or the like so as to enable the machine to be moved along the vegetation to be pruned, a first pruning assembly arranged for attachment to the frame, the first pruning assembly including first and second pruning apparatus arranged so that in use they can be positioned either side of a vegetation support wire on which required vegetation is located, said first and second pruning apparatus being arranged to prune non-required vegetation extending substantially above and/or below the support wire.

According to a second aspect of the present invention there is provided a pruning machine for pruning vegetation growing on at least a first and a second vertically-spaced support wires, said machine including a first pruning assembly having at least a first pair of spaced pruning apparatus, said spaced pruning apparatus being arranged so that during use they are arranged to prune non-required vegetation extending between said at least first and second spaced support wires to thereby create a window of cleared non-required vegetation between said vertically-spaced support wires.

Preferably, the first pruning assembly includes a shaft on which said first pair of spaced pruning apparatus are mounted. Each pruning apparatus preferably includes a first pruning plate having a central axis and an outer edge, a first set of blades on the first pruning plate and protruding outwardly from the outer edge. A second pruning plate is also provided and is arranged so that the respective central axes and outer edges of the pruning plates substantially coincide. A second set of blades is located on the second pruning plate. The blades protrude outwardly from the second pruning plate outer edge. In operation, the first set of blades rotates relative to the second set of blades so that scissor-like cutting actions are formed between them. As an optional feature, the direction of rotation of the first set of blades may be reversible. In normal use, rotation is in either the clockwise or counter-clockwise direction, but the direction of rotation may be reversed. This can assist in cleaning debris from the blades, and it can also be used to extend blade life, if the blades are symmetrical in shape and can cut in either direction.

Preferably, the blades on the first pruning plate and/or the blades on the second pruning plate taper from broader width at the outer edge of the respective pruning plates to a narrow width at the point furthest from the central axis.

One of the functions performed by the pruning plate or plates which rotates is to act as a flywheel, so that a steady weighted force is applied to the cutting effect of the blades.

The first pruning plate may be of any suitable shape and configuration. A preferred shape is a disc shape but other shapes such as polygonal shapes, star shapes and cartwheel shapes are also suitable. It is preferred that the first pruning plate be flat although other shapes such as a bowl shape are also suitable.

The second pruning plate may be of any suitable shape and configuration. The preferred shapes and features are similar to those for the first pruning plate. The second pruning plate is fixed while the first pruning plate rotates. The second pruning plate may be semicircular or some other shape which is not continuous in the full part of the rotating plates, because it is only necessary that fixed blades be provided at the locations at which cutting actually occurs.

The complete details of one form of the pruning apparatus are incorporated herein by reference to the applicant's earlier international patent application number PCT/AU98/00002.

Preferably, the first pruning assembly also includes a first protections plate arranged to be mounted on the shaft so that it is located between said first support wire and said first pair of spaced pruning apparatus. The first protection plate being arranged to prevent inadvertent damage to the first support wire or to required vegetation growing along said support wire.

The first protection plate may be of any suitable shape and configuration. A preferred shape is a disc shape. The disc is typically mounted on the shaft so that it can spin freely thereabout during operation of the pruning machine. The protection plate may be constructed in two parts which are bolted to a mounting collar mounted on the shaft. This allows for easy removal of the protection plate without disassembling the machine.

In a preferred arrangement of the invention, a first protection plate is provided so that in use it is located substantially above said first support wire and a second protection plate is mounted on the shaft so that in use it is located substantially below said first support wire. In this manner the vine cordon located along the support wire is protected from inadvertent damage during pruning.

As an alternative, or in addition, to the protection plate, a guard cage may be mounted about each pruning apparatus.

The guard cage is secured to a collar mounted on the drive shaft The guard cage is arranged to prevent inadvertent damage to the posts supporting the support wires and/or the substantially vertically extending trunk of the vegetation. The guard cage is typically divided into two halves which can be secured to the collar by bolts.

A guard cage preferably consists of an upper part, a lower part, and a plurality of bars extending between the top and bottom parts, shielding the blades of the pruning apparatus. The bars may extend directly downwards from the upper part to the lower part, but it is preferred that they be oriented at an angle to the vertical and spaced sufficiently closely that a vertical post or vine trunk cannot inadvertently pass between adjacent bars and come into contact with the blades.

Preferably, additional pruning apparatus are mounted on said shaft so that non-required vegetation below said first support wire and above said second support wire can also be pruned. In situations where there are more than said first and second support wires it will be appreciated by those skilled in the art that additional pruning apparatus may be incorporated.

Preferably, the pruning assembly is arranged to be mounted on a movable frame. The movable frame in turn being mounted to a support frame arranged for attachment to a tractor or the like. The support frame is preferably attached to the tractor or the like in a manner whereby the pruning machine can be moved between an operative position and a transport position. In the transport position the pruning machine is preferably located in front of or directly behind the tractor or the like.

The movable frame is arranged so that the pruning assembly can be moved away and toward the vegetation to be pruned so that guide posts, trunks of vegetation and other obstacles can be avoided. The movable frame thereby moves between a working position in which it prunes vegetation and a non-working position in which it is clear of the vegetation. Typically, movement of the movable frame to avoid obstacles is signaled by an arrangement of electronic eyes or limit switches which detect the presence of an obstacle. In response to such a signal, an accumulator or other alternative device is operated to cause pivotal movement of the movable frame away from the obstacle so that the pruning apparatus avoids contact therewith. Once the obstacle is cleared the accumulator or other alternative device is signaled and a biasing means serves to pivot the movable frame and thereby return it to the working positions.

To enable the pruning machine to prune vegetation on angled guides such as vines on a v-trellis, the pruning assembly and/or the support frame and/or the connection to the tractor or the like is capable of being tilted so as to accommodate the angled guides. It is envisaged that with such an arrangement, the longitudinal axis of the shaft of each pruning assembly will be capable of adopting an orientation of between vertical and approximately 45 degrees to the vertical.

In a preferred embodiment, the pruning machine includes first and second pruning assemblies with their respective shafts extending substantially parallel to each other. The pruning apparatus of each pruning assembly are spaced along their respective shafts. Preferably, each shaft has correspondingly positioned pruning apparatus which are just offset with each other a sufficient distance such that their respective blades do not contact.

Furthermore, the protection plates of each pruning assembly are also preferably offset relative to one another so that an edge portion of the protection plates of the first pruning assembly overlie an edge portion of a corresponding protection plate of the second pruning assembly.

Preferably, a pruning apparatus or multiples thereof are additionally provided to enable pruning of non-required vegetation extending substantially horizontally from the support wires. Thus, such a set of additional pruning apparatus would enable pruning of vegetation in a plane extending substantially parallel to the plane of the vertically-spaced support wires.

According to a third aspect of the present invention there is provided a method of pruning vegetation using a pruning machine in accordance with the first and second aspects of the invention.

BRIEF DESCRIPTION OF THE DRAWINGS

Embodiments of the invention will now be described, by way of example only with reference to the accompanying drawings in which:

FIG. 7 is an aerial view of a pruning machine but additionally including means for separating the pruning apparatus.

DETAILED DESCRIPTION

Figure 1:
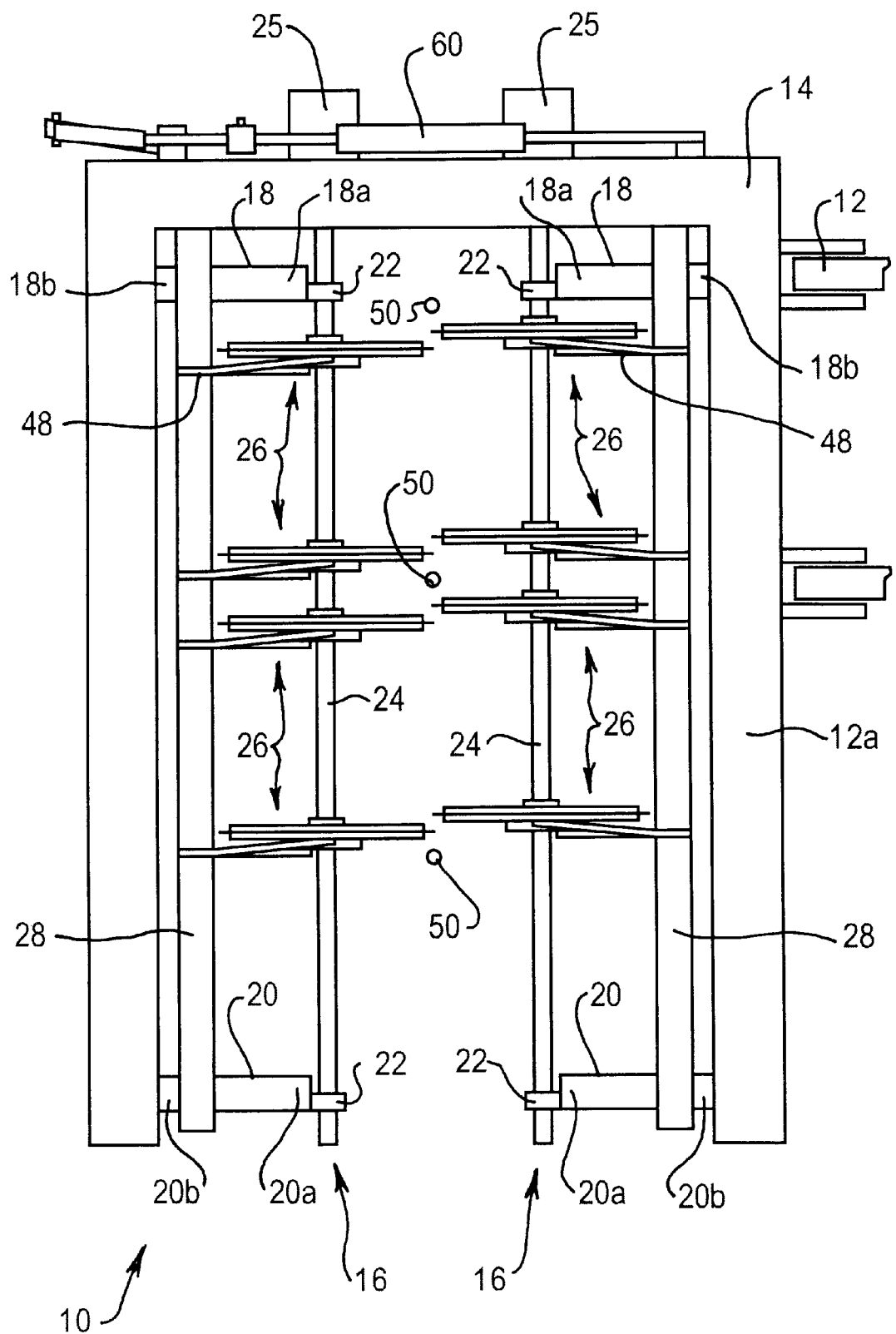
FIG. 1 is a schematic front view of a pruning machine in accordance with an embodiment of the invention.

FIG. 1 illustrates schematically a pruning machine 10 which is arranged to be mounted to a tractor or the like so that it can be traversed along a row of vine or other vegetation. To simplify the Figures, details of the connection of the pruning machine 10 to a tractor or the like are not illustrated. However, it should be appreciated that the pruning machine 10 is connected by a movable arm 12 to a tractor or the like so that when the pruning machine 10 is not in use and the tractor is moving from one location to the other, the pruning machine 10 can be pivoted by some form of drive to a location in front of or at the rear of the tractor. The connection of the pruning machine 10 to the tractor is also such that the vertical height of the pruning machine 10 relative to the ground can be varied.

The pruning machine 10 includes an inverted unshaped support frame 14 which is arranged to be connected to a tractor or the like via connection arm 12. A pair of pruning assemblies 16 are each pivotally mounted to the rear side of the support frame 14 by means of upper and lower support arms 18, 20. Mounted in bearings 22 on the distal end 18a, 20a of each of the support arms 18, 20 is a drive shaft 24. Drive shaft 24 has a longitudinal axis extending substantially parallel to the arms 12a of the inverted unshaped support frame 14. Drive shaft 24 is arranged to be rotated by a hydraulic drive 25. To simplify the Figures the hydraulic fluid lines of the hydraulic drive 26 have not been illustrated.

Mounted on each drive shaft 24 are four spaced pruning apparatus 26. Although four apparatus 26 are shown in FIG. 1 more or less pruning apparatus 26 may be mounted thereon.

Extending parallel to the drive shaft 24 and mounted on the proximal end 18b, 20b of the support arms 18, 20 is a secondary support member 28.

Figure 2:
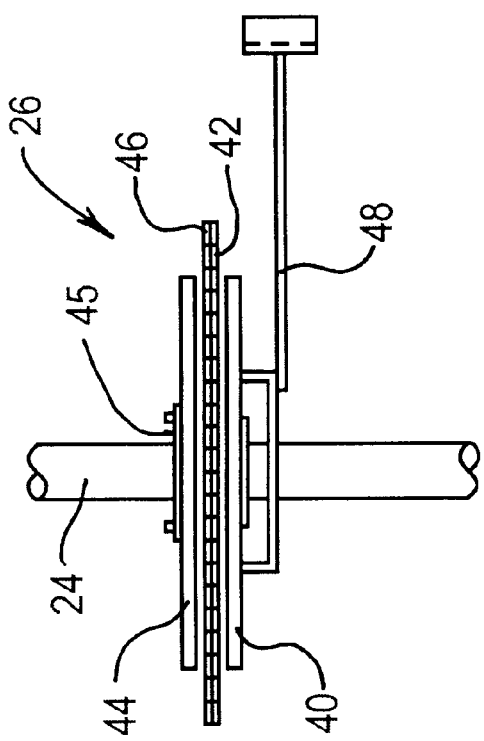
FIG. 2 is a side view of a pruning apparatus in accordance with an embodiment of the invention.

As shown in FIG. 2, each pruning apparatus 26 works as a pruning mechanism and includes a first pruning plate 40 mounted on the drive shaft 24 The first pruning plate 40 has a set of blades 42 located thereon. Blades 42 extend and protrude outwardly of the outer edge of the pruning plate 40. A second pruning plate 44 is damped to a collar 45 which is mounted on the drive shaft 24 coaxially aligned with the first pruning plate 40. A second set of blades 46 are located on the second pruning plate 44 and protrude outwardly from the edge of the second pruning plate 44. In operation, the first pruning plate 40 is fixed and the second pruning plate 44 rotates so that a scissor-like cutting action is formed there between. In this manner, the blades 42, 46 can be, used to prune vegetation. In a preferred embodiment of the invention, second pruning plate 44 is able to rotate in either the clockwise or counter-clockwise direction. This facilitates even usage of both aspects of the serrations present on blades 46 and aids with the release of foliage which may become trapped between pruning plates 40 and 44. Preferably, the direction of rotation of second pruning plate 44 can be alternated between clockwise and counter-clockwise by way of a switch or lever, at the discretion of the operator.

The pruning plates may be of any suitable size. An especially suitable size for the pruning plates is a diameter of about 350 mm, with 12 blades being installed around the perimeter of each plate. In this arrangement, every second blade may be removed from the rotating plate in order to give a different cutting effect. Another suitable size is a diameter of about 250 mm, with 8 blades being installed around the perimeter of the plate.

The first pruning plate 40 is prevented from rotation by an arm 48 which at one end 48a is connected to the underside of the first pruning plate 40 and at the other end 48b is connected to the secondary support member 28. The vertical position of the arm 48 on the secondary support member 28 is variable to correspond to the variable position of each pruning apparatus on the drive shaft 24.

The pruning apparatus 26 of the respective drive shafts 24 are arranged thereon so that, for example the lowermost pruning apparatus 26 on the left hand side draft shaft 24 is located just below the height of the lowermost pruning apparatus 26 on the right hand side drive shaft 24. This staggered arrangement of the pruning apparatus 26 as shown in FIG. 1, enables effective overlap between the blades 42, 46, of adjacent pruning apparatus 26 so as to ensure complete pruning of vegetation above or below a support wire 50.

FIG. 1 shows the horizontally extending support wires 50 which support the cordons of a vine to be pruned. To enable the canes to be trimmed from the cordons the pruning apparatus 26 of the pruning machine 10 must be spaced along the length of the drive shaft 24 at appropriate intervals. As is shown in FIG. 1, a first pruning apparatus 26 is positioned on each of the drive shafts 24 so that it is vertically above the lowermost support wire 50, a second pruning apparatus 26 is located vertically below the intermediate support wire 50, a third pruning apparatus 26 is positioned above the intermediate support wire 50 and a fourth pruning apparatus 26 is located below the uppermost support wire 50. It will thus be appreciated that because of the arrangement of the pruning apparatus 26 relative to each of the support wires 50 it will be possible to clear all non-required vegetation from between adjacent vertically spaced support wires 50. In this manner, a window of cleared non-required vegetation will be formed between each of the adjacent support wires 50.

Although not illustrated in FIG. 1, additional pruning apparatus 26 may be provided to trim canes which extend downwardly from the lowermost support wire 50 and upwardly from the uppermost support wire 50. Additionally, in one preferred embodiment, additional pruning apparatus 26 mounted on a drive shaft having a longitudinal axis positioned substantially horizontally, may be mounted on the support frame 14. Such additional pruning apparatus would enable pruning of canes extending substantially horizontally from the support wires.

In the embodiment shown in FIG. 7, a sliding arm 150 is pivotally attached at one end 150a, to upper and lower arms 18, 20, midway between the first pruning plate 40, and the secondary support member 28. The other end 150b of the arm 150 contains a slot 151 through which a pin 152, which is attached to a fixed support 153, is free to slide. Pin 152 acts as a sliding hinge forming a movable joint between arm 150 and support 153, allowing opening and closing of pruning assembly 16. Support 153 is attached to rod 154, which is connected to piston 155. which is moveable within cylinder 157, mounted on top of the support frame 14. As illustrated in FIG. 7, cylinder 157 is filled with oil and the apparatus is in its normally extended position (i.e. in normal working mode).

The pruning machine 10 is preferably fitted with a series of electronic eyes or limit switches which are arranged to detect the presence of an obstacle such as a support post or the trunk of a vine. When the electronic eye or limit switch fitted to the pruning machine 10 detects the presence of an obstacle, the accumulator is actuated, drawing oil out of cylinder 157 and causing piston 155 to be drawn into cylinder 157. As piston 155 draws into cylinder 157, rod 154 and attached support 153 move toward cylinder 157. The movement of support 153 with pins 152 attached and which is fixed to rod 154, causes arm 150 to move with support 153. Arm 160 is attached to upper and lower arms 18,20, by way of pivoting joint 158. As support 153 causes arm 150 to move toward pruning plates 40, upper and lower arms 18, 20 pivot at joint 158 resulting in the separation of pruning apparatus 26, thereby avoiding contact with obstacles such as support posts or vine trunks which are likely to damage blades 42, 46.

Similarly, when the electronic eye or limit switch determines that the pruning machine has cleared the obstacle, the accumulator is again actuated, sending oil back into cylinder 157 such that piston 155 moves out of cylinder 157 to its normal working position. This in turn restores support 153 and arm 150 to their respective normal working positions and causes upper and lower arms 18, 20 to return to their normal working positions.

It is preferred that in addition to automatic activation of the accumulator using an electronic eye or limit switch, there is a switch or lever, not shown, located within the reach of the operator of pruning machine 10 which facilitates manual activation of the accumulator or the release of oil from cylinder 157 in order to separate pruning apparatus 26. If an obstacle comes into sight of the operator of pruning device 10, the operator is able to adjust the separation of pruning apparatus 26 located on either side of the vegetation being pruned in order to avoid the obstacle in the manner previously described but using the switch or lever instead of using the automatic obstruction sensor. The operator, also use the switch or lever to return pruning apparatus 26 to is normal working position when it is clear that the obstacle has been passed by. Although the accumulator used in this example of the invention is a oil accumulator, any other actuator may be used to activate the movement of piston 155 in cylinder 157.

It is preferred that in addition to the separation of pruning apparatus 26 caused by detection of obstacles in the path of the pruning machine either automatically or by the operator, pruning apparatus 26 can separate upon contacting an obstacle such as a vine trunk or support post, independently. As the blades come into contact with the obstacle, pruning apparatus 26 separate by pivoting at joint 158 causing arm 150 to move. As arm 150 moves, slot 151 at end 150b of arm 150 slides along pin 152, without movement of support 153, or movement of piston 155 inside cylinder 157. When the pruning machine has passed the obstacle, the blades return to their normal working position by way of a spring (not shown) which otherwise maintains the position of pruning apparatus 26 relative to pruning machine 10 when pruning apparatus 26 is in the normal working position.

The operator can choose to change the mode of operation such that pruning apparatus 26 cannot separate without automatic or manual actuation. The configuration of the connection of upper and lower arms 18, 20 to arm 150 may be altered such that end 150b of arm 150 is not slidably attached to support 153. Instead, end 150b of arm 150a is pivotally foxed to support 153. To achieve this, pin 152 is removed from slot 151 and inserted into tab 159, which forms a pivoting joint with pin 152. In this configuration, the position of pruning apparatus 26 and separation of blades 42, 46 can only be altered by manual or automatic actuation of an actuator resulting from movement of piston 155 inside cylinder 157.

Figure 3:
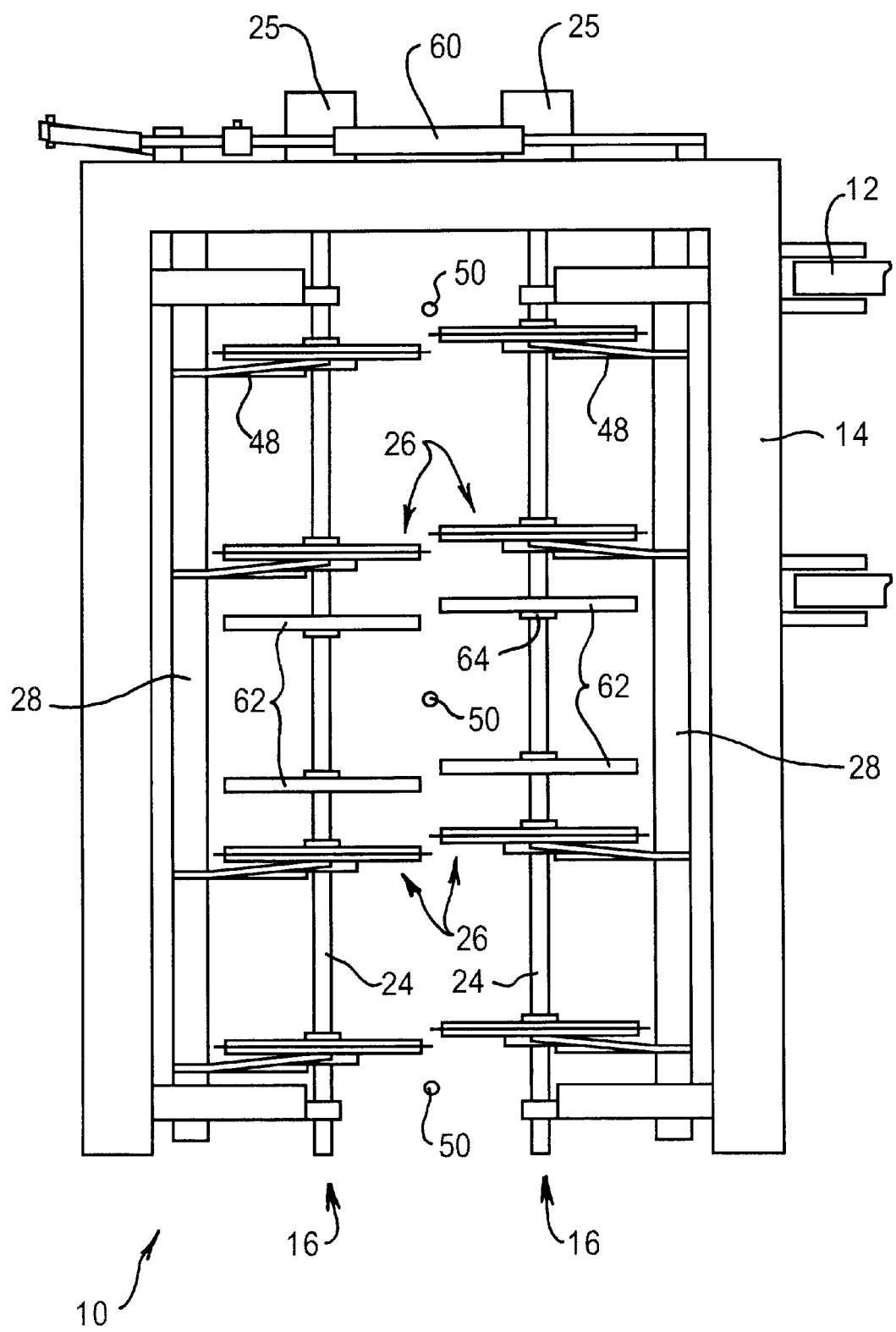
FIG. 3 is a front view of a pruning machine similar to that shown in FIG. 1 but additionally including multiple protection plates.

The pruning machine 10 shown in FIG. 3 is substantially identical to that of FIG. 1 with the exception that the pruning apparatus 26 are located at different positions on their respective drive shafts 24. In addition, two protection plates 62 are mounted on each of the drive shafts 24. The protection plates 62 are positioned so that they are either side of the support wire 50 and in between the pruning apparatus 26. The protection plates 62 are mounted on collars 64 (similar in configuration to collars 45) so that they spin freely about the drive shaft 24. Typically, the protection plates 62 comprise a flat disc which may have a rubber edging on the periphery thereof. The purpose of the protection plates 62 is to ensure that there is no contact by the pruning apparatus 26 with the support wire 50 or the cordons of the vines, and to ensure that the pruning assemblies open when they come into contact with fixed vertical supports or vine trunks. Additional protection plates 62 may be added to the drive shafts 24 as required.

Figure 5:
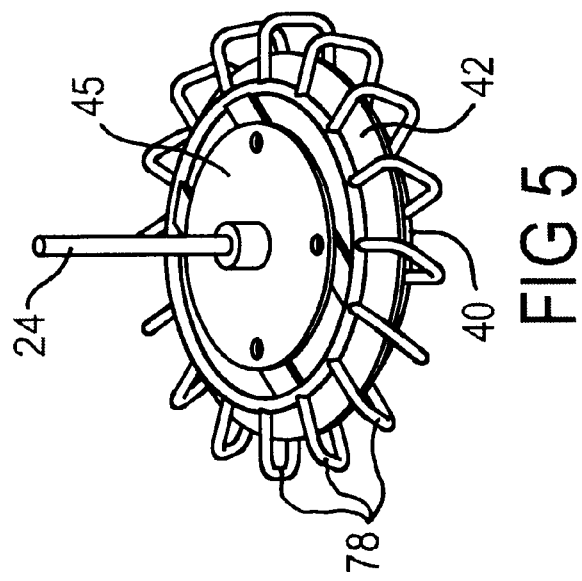
FIG. 5 illustrates the guard cage shown in FIG. 4 attached to the shaft of a pruning assembly.
Figure 4:
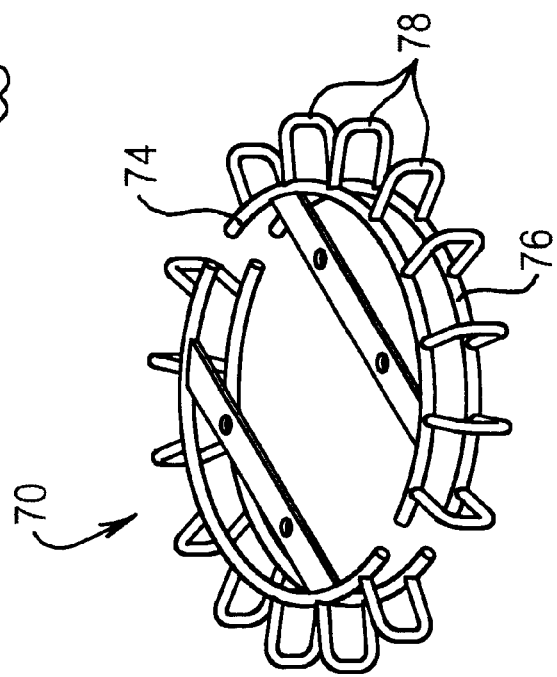
FIG. 4 illustrates two halves of a guard cage arranged to be attached about a pruning apparatus.

FIG. 4 illustrates a guard cage 70 for mounting about each of the pruning apparatus 26. The pruning apparatus 26 as shown in FIG. 5 does not include any blades 42, 46. The guard cage 70 is formed in two halves so that it may easily be bolted to the collar 45. The guard cage 70 is defined by an upper and a lower circular frame 74, 76. Extending between the upper and lower frame member 74, 76 are a plurality of blade guards 78 which are shaped so that the cutting blades may rotate freely within the guard 70. The blade guards 78 may either be oriented substantially vertically or, as illustrated in FIG. 5, may be inclined with respect to the vertical. The purpose of the guard cage 70 is to prevent damage of a support post or other obstacle if the pruning apparatus 26 inadvertently contacts therewith. If contact with an obstacle by the guard cage 70 occurs the guard cage will simply pass around the obstacle without any damage thereto. Additionally, the guard cage 70 protects the blades 42, 48 from damage. Clearly, the guard cage 70 must allow proper feed of vegetation into the pruning apparatus 26. By selecting an appropriate spacing between adjacent blade guards 78 and orienting the blade guards angularly, as illustrated in FIG. 5, the possibility of a vertically oriented fence post passing between adjacent blade guards can effectively be precluded, without significantly reducing the feed of vegetation into pruning apparatus 26.

The pruning machine 10 illustrated in the Figures is arranged to prune vines wherein the support wire are spaced substantially vertically one above the other. However, some vines are grown on a v-trellis and accordingly there is a need for a mechanism by which such vines can be pruned. An embodiment of the present invention can be adapted so that the pruning assemblies 16 and/or the support frame is capable of being tilted to accommodate the angled support wires. Alternatively, the support 12 extending from the tractor or the connection thereto may be capable of rotation so as to enable the orientation of the drive shafts 24 of the pruning assemblies 16 to be angled and thereby enable pruning of the v-trellis.

The embodiment of the invention described herein is seen to be particularly advantageous because it effectively and efficiently prunes vegetation such as vines which are supported on support wires. Additionally, the machine is advantageous because it is arranged so that it does not cause damage to the cardons, other parts of the vine or to the support posts.

Throughout this specification we have used the term "support wires" to refer to the supports on which the vine or other vegetation is grown. Clearly, other forms of supports are envisaged and the present invention should not be limited by the use of the term "support wires". Additionally, the pruning machine has been described as having hydraulic drives to drive the drive shafts 24 and the connection to the tractor. Clearly other forms of drive motors are applicable.

Although the described preferred embodiment incorporates a pair of pruning assemblies 16 it will be appreciated that a pruning machine 10 having a single pruning assembly 16 may be desired is some situations.

Figure 6:
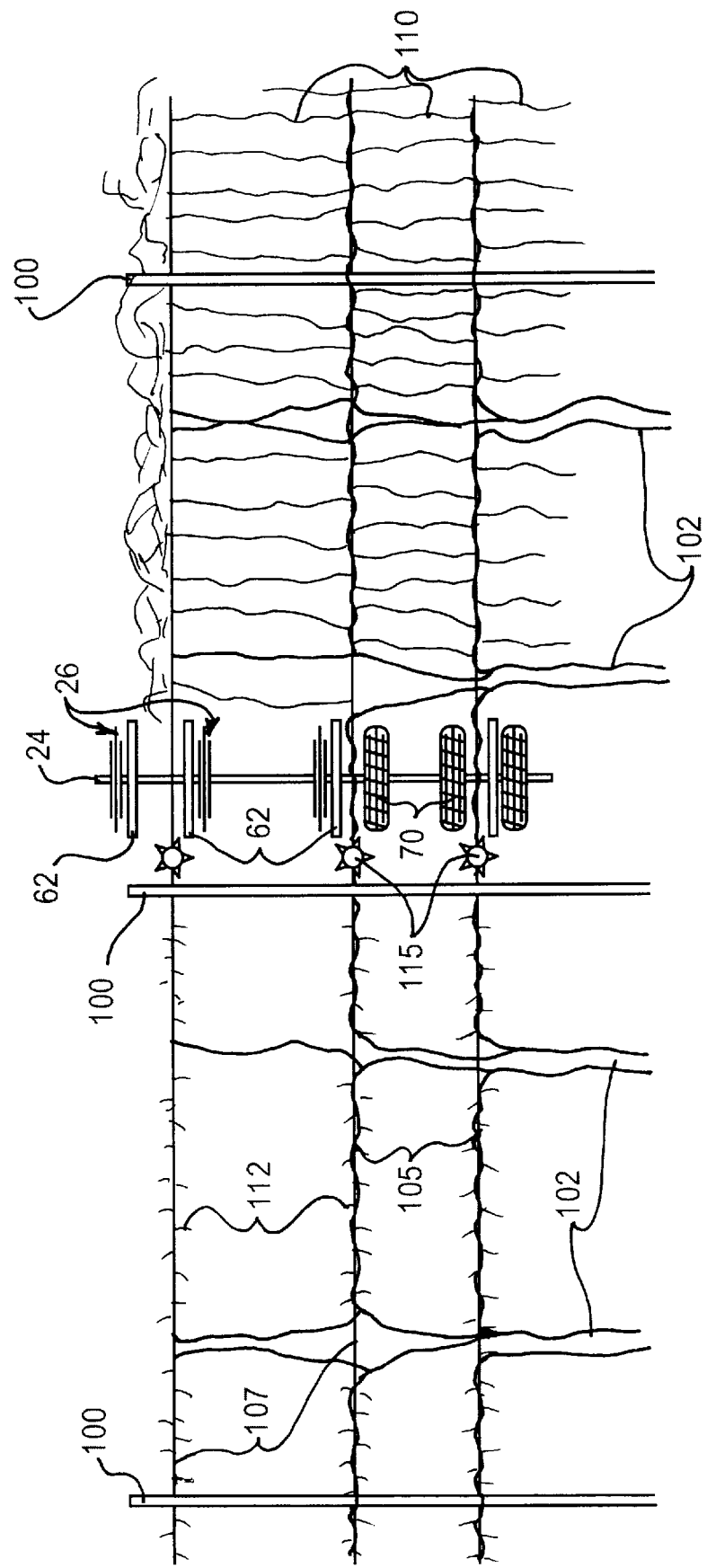
FIG. 6 illustrates apparatus according to an embodiment of the invention being used in pruning a row of trellised vines.

Referring now to FIG. 6, there is shown apparatus according to an embodiment of the invention, for use in pruning a row of trellised vines. Support posts 100 have extending between them support wires 107. In the embodiment illustrated, there are three wires, although this is an arbitrary number. The vines consist of vine trunks 102, cordons 105 which have been trained to extend along support wires 107, and canes 110 which extend between, above or below cordons 105.

During pruning it is desirable to remove canes 110 without damaging trunks 102, cordons 105, posts 100, or the blades of the pruning apparatus. In order to accomplish this, the apparatus of the present invention provides sets of pruning apparatus 26 which can be fixed at suitable heights for cutting canes without cutting cordons, and protective plates 62 and/or cages 70 which serve two main purposes, namely (a) to guard cordons 105 and (b) to prevent damage to posts 100, trunks 102 and the vertical parts of cordons 105. This latter purpose is achieved by the pruning machine (which consists of two pruning assemblies, one on each side of the row of vines, although for the sake of clarity only one is illustrated in FIG. 6) opening up when the protective plates or guard cages come to a post or vine trunk to allow the post or trunk to pass through the machine uncut. This also results in matter above a vine trunk (namely the vertical parts of cordons) remaining uncut.

As can be seen in FIG. 6, the apparatus is effective in cutting "windows" in the vegetation. In FIG. 6, the pruning machine is moving fom left to right down the row of vines, leaving behind cut ends of canes 112. Cut canes may protrude horizontally as well as vertically, and FIG. 6 shows additional vertically oriented sets of pruning apparatus 115 trailing behind the pruning machine, spaced a little to either side of the cordons, in order to cut any canes or vegetation extending horizontally outwards from the support wires, thereby resulting in a tidier pruning job.

It is to be understood that various alterations, additions and/or modifications may be made to the parts previously described without departing from the ambit of the invention.

What is claimed is:

1. A pruning machine for pruning vegetation growing on at least an upper and a lower vertically-spaced support wires, said machine including a first pruning assembly having at least a first pair of vertically spaced pruning apparats, each pair of vertically spaced pruning apparatus being disposed on the same drive shaft of said machine, each vertically-spaced pruning apparatus including a movable pruning plate having a first set of blades positioned thereon and a stationary pruning plate having a second set of blades positioned thereon, said at least first pair of vertically spaced pruning apparatus being separated by an amount less than the vertical spacing of said upper and lower support wires so that during use the first pair of vertically spaced pruning apparatus are arranged to prune non-required vegetation extending between said upper and lower vertically-spaced support wires to create a window of cleared non-required vegetation between said vertically-spaced support wires.

2. A pruning machine according to claim 1 further including one or more additional pairs of vertically spaced pruning apparatus located above or below the first pair, wherein the pruning machine prunes non-required vegetation in spaces between three or more vertically-spaced support wires to create a plurality of windows which are free of vegetation between the respective vertically-spaced support wires.

3. A pruning machine according to claim 1 further including a second pruning assembly, such that in use a row of vegetation is pruned when it passes between the first and second pruning assemblies, wherein the first and second pruning assemblies are normally biased into an overlapping orientation in which vegetation is restricted from passing therebetween without being pruned, but the first and second pruning assemblies are separable on encountering a substantially rigid object to allow the substantially rigid object to pass therebetween.

4. A pruning machine according to claim 3 further including one or more guards mounted about one or more of the pruning apparatus, wherein the first and second pruning assemblies separate when the one or more guards encounter a substantially rigid object to allow the substantially rigid object to pass between the first and second pruning assemblies.

5. A pruning machine according to claim 1 further including at least one protection plate located above or below at least one of the pruning apparatus, wherein the first and second pruning assemblies separate when the at least one protection plate encounters a substantially rigid object to allow the substantially rigid object to pass between the first and second pruning assemblies.

\* \* \* \* \*

UNITED STATES PATENT AND TRADEMARK OFFICE
CERTIFICATE OF CORRECTION

| | | |
|---|---|---|
| PATENT NO. | : 6,523,337 B2 | Page 1 of 1 |
| APPLICATION NO. | : 09/837201 | |
| DATED | : February 25, 2003 | |
| INVENTOR(S) | : Fred Spagnolo | |

It is certified that error appears in the above-identified patent and that said Letters Patent is hereby corrected as shown below:

On Title Page Item -73- change "F&T Spagnolo TTY Ltd." to --F&T Spagnolo Pty Ltd--

Column 2, line 44, change "protections" to --protection--.

Column 5, line 20, change "can be, used" to --can be used--.

Column 5, line 40, change "rotation" to --rotating--.

Column 5, line 49, change "draft" to --drive--.

Column 6, line 45, change "18,20," to --18, 20,--.

Column 7, line 4, change "The operator, also" to --The operator can also--.

Column 7, line 5, change "to is normal" to --to its normal--.

Column 7, line 31, change "foxed" to --fixed--.

Column 8, line 32, change "cardons" to --cordons--.

Column 9, line 8, change "fom" to --from--.

Column 9, line 23, change "apparats" to --apparatus--.

Signed and Sealed this

First Day of May, 2007

JON W. DUDAS
*Director of the United States Patent and Trademark Office*